United States Patent [19]

Hedley

[11] Patent Number: 5,129,168
[45] Date of Patent: Jul. 14, 1992

[54] MOON LOCK

[75] Inventor: Ian Hedley, Sydney, Australia

[73] Assignee: Hedweld Engineering Pty. Limited, New South Wales, Australia

[21] Appl. No.: 496,892

[22] Filed: Mar. 21, 1990

[30] Foreign Application Priority Data

Mar. 21, 1989 [AU] Australia ................ PJ3319

[51] Int. Cl.$^5$ ............................................. E02F 9/28
[52] U.S. Cl. .................... 37/141 R; 403/380; 403/381; 172/719
[58] Field of Search ............. 403/353, 393, 381, 380; 37/141 R, 135; 172/719, 751, 753

[56] References Cited

U.S. PATENT DOCUMENTS

| | | | |
|---|---|---|---|
| 3,971,323 | 7/1976 | Beiswenger | 172/719 X |
| 4,128,132 | 12/1978 | Moen et al. | 37/141 R X |
| 4,129,952 | 12/1978 | Olson | 37/141 R X |
| 4,312,145 | 1/1982 | Lukavich | 37/124 |
| 4,547,985 | 10/1985 | Silins et al. | 37/141 R X |
| 4,716,666 | 1/1988 | Potter | 37/135 |
| 4,995,176 | 2/1991 | Briscoe et al. | 37/141 R |
| 5,005,304 | 4/1991 | Briscoe et al. | 37/141 R |
| 5,056,243 | 10/1991 | Sprunger et al. | 37/141 R X |

Primary Examiner—Randolph A. Reese
Assistant Examiner—Arlen L. Olsen
Attorney, Agent, or Firm—Hopgood, Calimafde, Kalil, Blaustein & Judlowe

[57] ABSTRACT

A locking arrangement and method of locking a plurality of plate members (1) (FIG. 5) to a base surface, the base surface being provided with a plurality of locking anchors (5) provided in spaced apart relationship thereon. The locking arrangement is particularly suitable to eliminate the requirement for welding wear plates to equipment such as earthmoving equipment, washery and crushing equipment.

10 Claims, 10 Drawing Sheets

MOON LOCK

The present invention relates to a locking arrangement, and in particular, to a locking arrangement which is useful for adapting wear plates to equipment, such as that utilised in the mining industry, in washeries, or for crushing, etc.

BACKGROUND OF THE INVENTION

At present, in applying wear plates to earthmoving equipment, it is necessary to separately weld a multiple number of wear plates to the exterior surfaces of the said earthmoving equipment.

Mining equipment wear plates for instance are applied to earthmoving equipment to reduce the wear to the equipment itself. Instead of the actual equipment being worn, the wear plates are worn, the wear plates then being able to be relatively easily replaced at the required periods of time. This reduces the unnecessary fabrication of earthmoving equipment, by increasing the working life of said equipment.

At present, earthmoving equipment wear plates are constructed of extremely hard, abrasive resistant material which is designed to resist wear. These earthmoving equipment wear plates are constructed in sections, and each is separately welded to the surface of the earthmoving equipment. As will be appreciated, this welding operation, in attaching the earthmoving equipment wear plates to the earthmoving equipment, is extremely time consuming, resulting in, not only excessive time and man hours being spent in welding the wear plates to the earthmoving equipment, together with very long downtimes of the equipment itself, but also, the earthmoving equipment wear plates are prone to become dislodged from the earthmoving equipment due to difficulty in successfully welding the abrasive resistant material to the dissimilar parent material of the equipment.

The present invention seeks to overcome the disadvantages of the prior art, by providing a simple and easy application method and apparatus for attaching the wear plates to the earthmoving equipment.

The present invention also seeks to overcome the necessity to weld each and every wear plate to the earthmoving equipment, by providing a quick and simple interlock means to securely attach the wear plates to the equipment.

BRIEF DESCRIPTION OF THE INVENTION

In one broad form, the present invention comprises a locking arrangement for locking a plurality of plate members to a base surface, said base surface being provided with a plurality of locking anchors provided in spaced apart relationship thereon, each of said plate members being provided with at least one anchor receiving member thereon, each of said anchor receiving members being adapted to engage one of said anchors, such that, the edges of each said plate members are adapted to abutt with the edges of adjacent plate members, with the outer plate members being adapted to abutt retaining members being affixed to said base surface such that, each of said plate members is thereafter prevented from disengagement from said anchors.

In a further broad form, the present invention provides a method of applying a plurality of plate members to a base surface, said base surface having a plurality of anchors provided in spaced relationship thereon, and said plate members each having at least one anchor receiving portion thereon, said method comprising the steps of:

supplying a first of said plate members onto said base member by providing said at least one anchor receiving portion thereof in engagement with a said respective one of anchors;

supplying further plate members onto said base member, each of said plate members being supplied in end abutting relationship with plate members subsequently supplied to said base member, such that, provision of plate members in such position prevent subsequently applied plate members from disengagement from said anchors; and, supplying retaining members around at least one peripheral row of plate members to abut with and consequently retain said plate members to said base plate.

The present invention will become more fully understood from the following detailed description thereof.

In order to facilitate the simple understanding of the present invention, the present invention will be described with reference to the accompanying drawings in which;

DETAILS OF THE INVENTION

Figure 1:
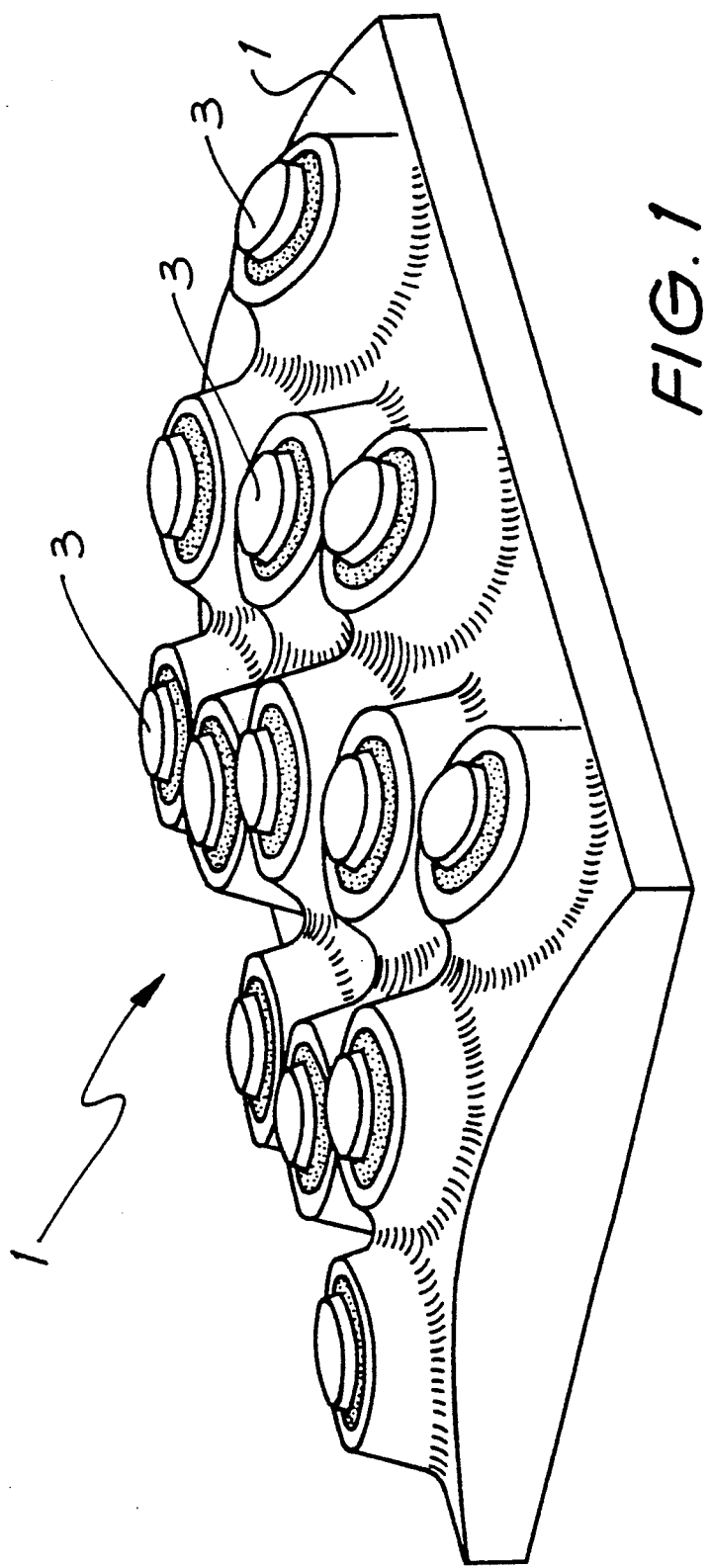
FIG. 1 illustrates an isometric view of a wear plate for earthmoving equipment, illustrating an application of the moonlock arrangement in accordance with the present invention.

In FIG. 1, an isometric view of a wear pad or wear plate for equipment such as that utilised in mining, washeries or crushing mills, is shown. Such an equipment wear pad can be adapted, by use of the moon lock arrangement in accordance with the present invention, to an equipment. The wear plate arrangement, generally designated by the numeral 1, comprises a body section 2, with a number of wear plate protrusions 3 spaced thereon, as required in accordance with the particular application of use. Wear plates are well known in the prior, reference being made to Potter U.S. Pat. No. 4,716,66, Moen U.S. Pat. No. 4,128,132 and Beiswenger U.S. Pat. No. 3,971,323. Wear plates are commonly applied to equipment such as earthmoving mining, washery and crushing equipment, to protect the earthmoving equipment from wearing out by constant usage. Rather than the equipment itself wearing out, the wear plates, which can be replaced, are changed after an appropriate amount of use of said equipment.

The preferred embodiment of the present invention will be hereinafter described with reference to the wear plates of the present invention being adapted to earthmoving equipment. It should however be understood that the invention is not limited to such particular application.

Previously however, a suitable method of attaching the wear plates to the earthmoving equipment has not been provided. At present, it is necessary to weld the wear plates to the earthmoving equipment. As will be appreciated, this is an extremely time-consuming process, when the earthmoving equipment itself cannot be utilised for the purpose of mining.

Figure 2:
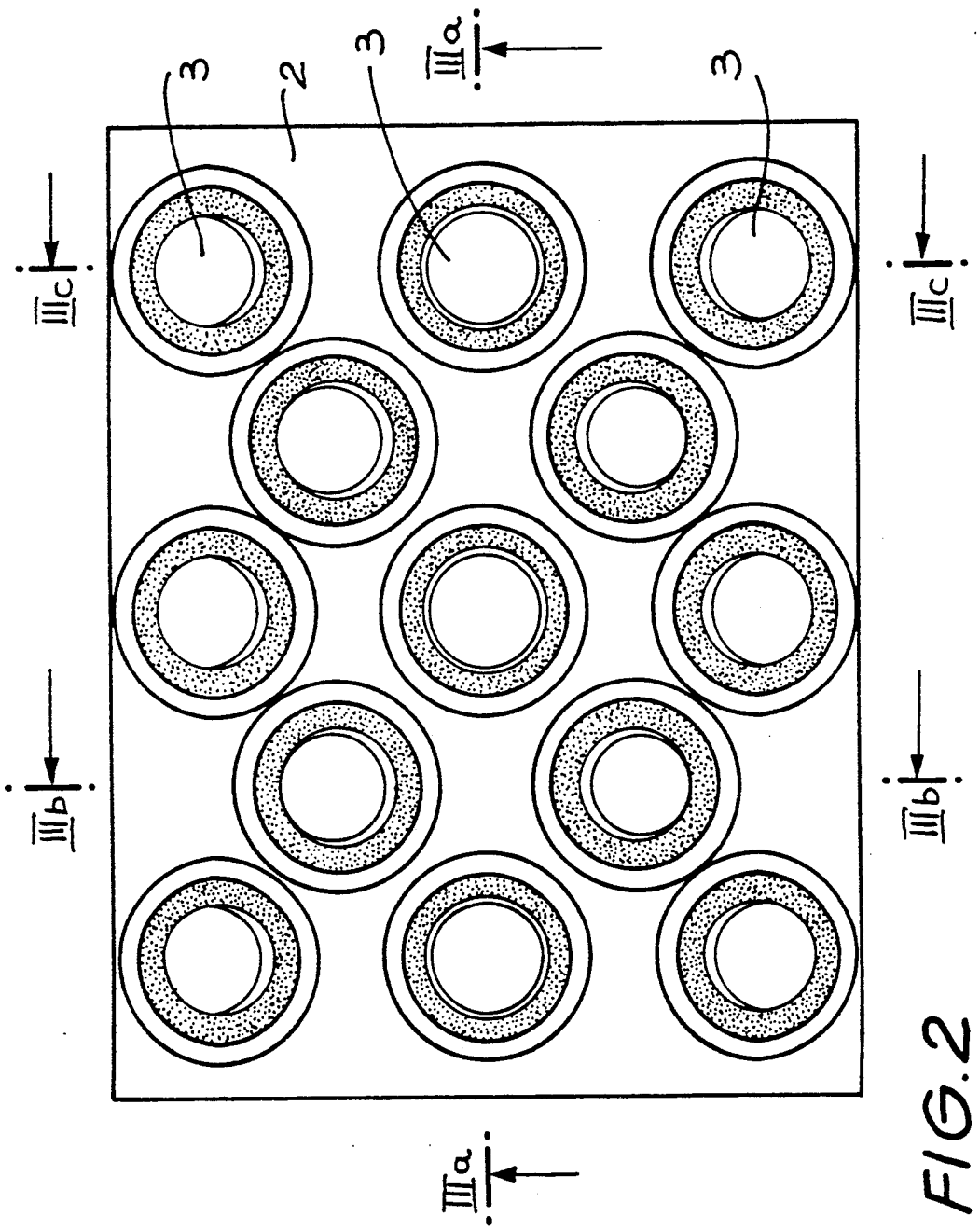
FIG. 2 details the plan view of the earthmoving equipment wear plate configuration of FIG. 1.

In FIG. 2 is detailed a plan view of the earthmoving equipment wear plate configuration shown in FIG. 1. FIG. 2 illustrates the spaced apart relationship of the various wear plate protrusions 3 as applied to the body 2.

Figure 3A:
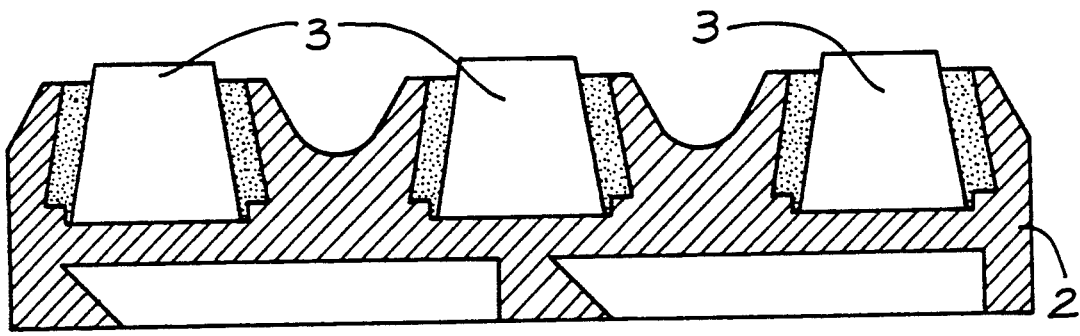
FIGS. 3a, 3b and 3c show three cross-sectional views of the configuration illustrated in FIG. 1.
Figure 3B:
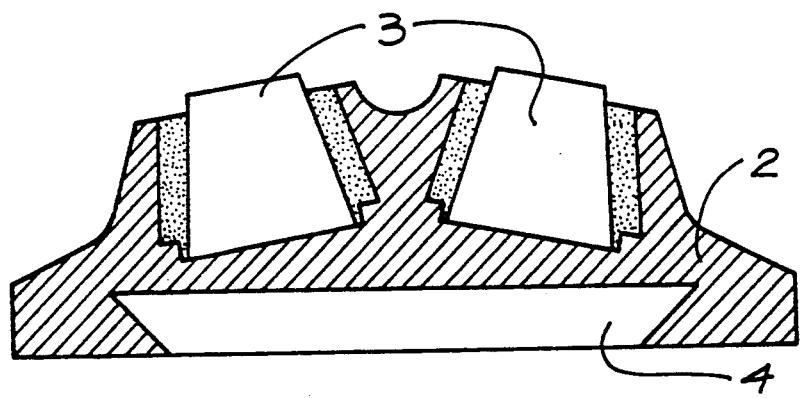
Figure 3C:
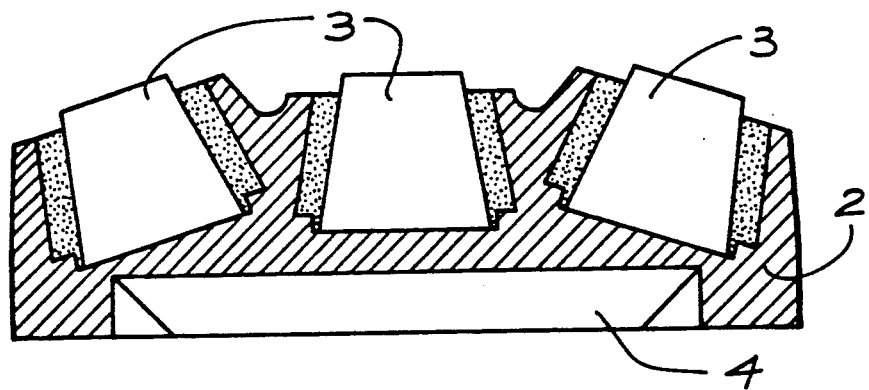

FIG. 3a illustrates a cross-sectional view through line AA of FIG. 2, illustrating the wear plate protrusions 3 protruding through the upper surface thereof, and the moonlock anchor receiving recess or female portions 4 at the lower surface thereof. FIG. 3b illustrates a cross-sectional view through line BB of FIG. 2, showing the preferred angled inclination of the wear plate protrusion 3 in accordance with the illustration of FIG. 1. FIG. 3c shows a cross-sectional view through line CC of FIG. 2, also illustrating the angled protrusion of the two outer wear plate protrusions 3, also in accordance with FIG. 2.

Figure 4:
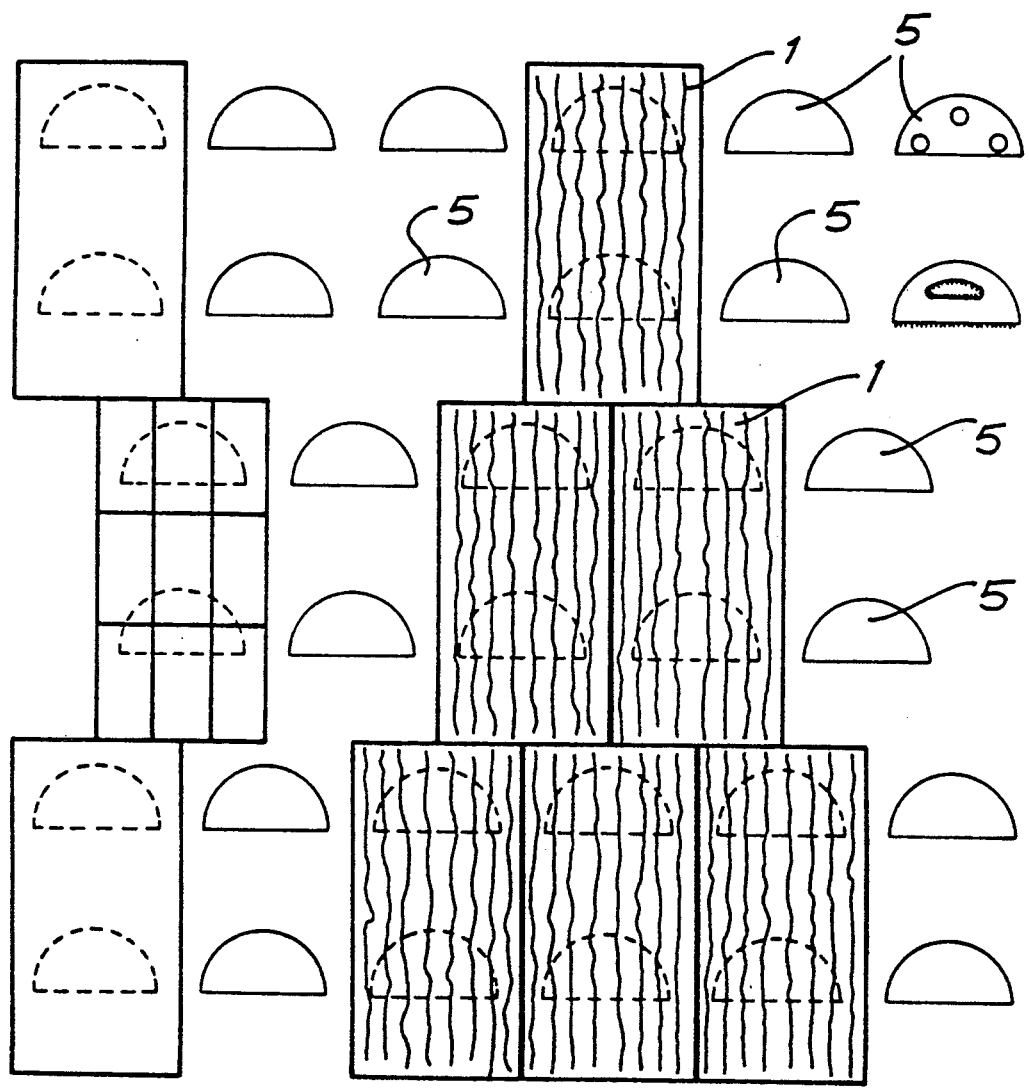
FIG. 4 shows several earthmoving equipment wear plates being provided in locking arrangement by use of the moonlock arrangement in accordance with the present invention.

In FIG. 4 is illustrated how several earthmoving equipment wear plate sections may be inter-engaged by means of the moonlock arrangement in accordance with the present invention. The figure illustrates how a plurality of spaced apart moon lock anchors 5 are provided on the exterior surface of a earthmoving equipmentl. In accordance with the preferred embodiment of the present invention, each wear plate 1 is extended over and adapted to engage two adjacent upstanding moon lock anchors 5, which themselves are welded or bolted to the base of the earthmoving equipment. As illustrated in FIG. 4, each separate earthmoving equipment wear plate 1 is located such that the ends thereof abut the two adjacent earthmoving equipment wear plates 1, located in the adjacent rows thereto. Obviously, however, the wear plates 1 near to the perimeter of the equipment may be varied in size such that, if required, the edges of each perimeter weat plate 1 may be substantially aligned. This may be achieved by varying the chute size of the individual wear plates. When designing wear plates to fit a specific equipment, it is advantageous to have a computer facility as an aid therefore. For instance, the physical dimensions and constraints may be inputted into the computer and the computer may then automatically calculate the preferred size of the individual wear plates such that they completely cover the external surface of the equipment. By such method, the chute size may be varied in width, breadth and thickness, as required. Each of the moon lock anchors 5 is preferably constructed of mild steel, stainless steel or any other material which is suitable for the application. The wear plates of the present invention may be cast or manufactured out of plate. The adaptor plates may be covered by a variety of wear materials, for example, bisalloy 360 or the like, polyurathane plastics, ceramic tiles, etc.

Figure 5A:
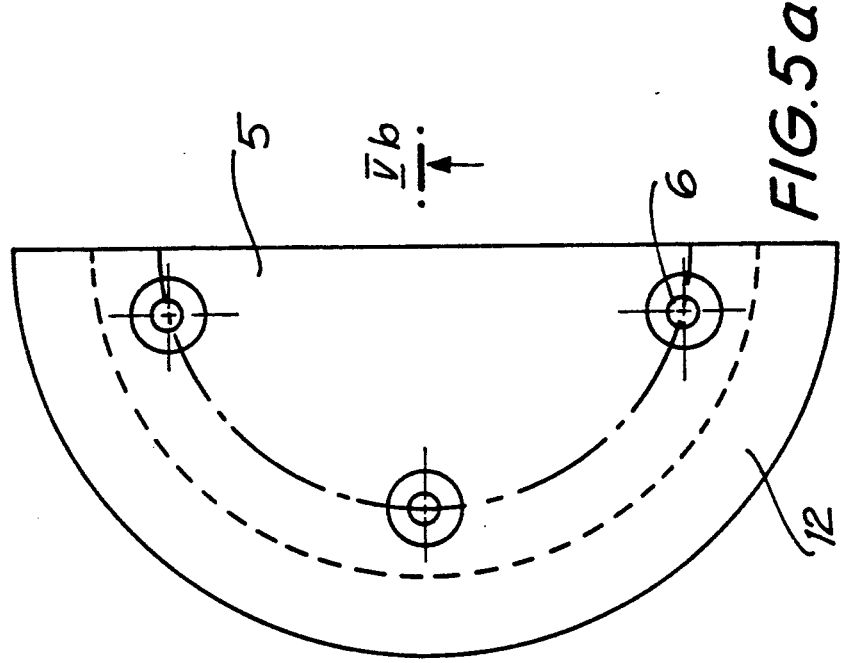
FIGS. 5a, 5b, 5c and 5d depict a plan view and an elevational view of the moonlock anchor plate.
Figure 5B:
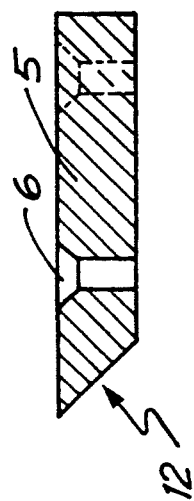
Figure 5C:
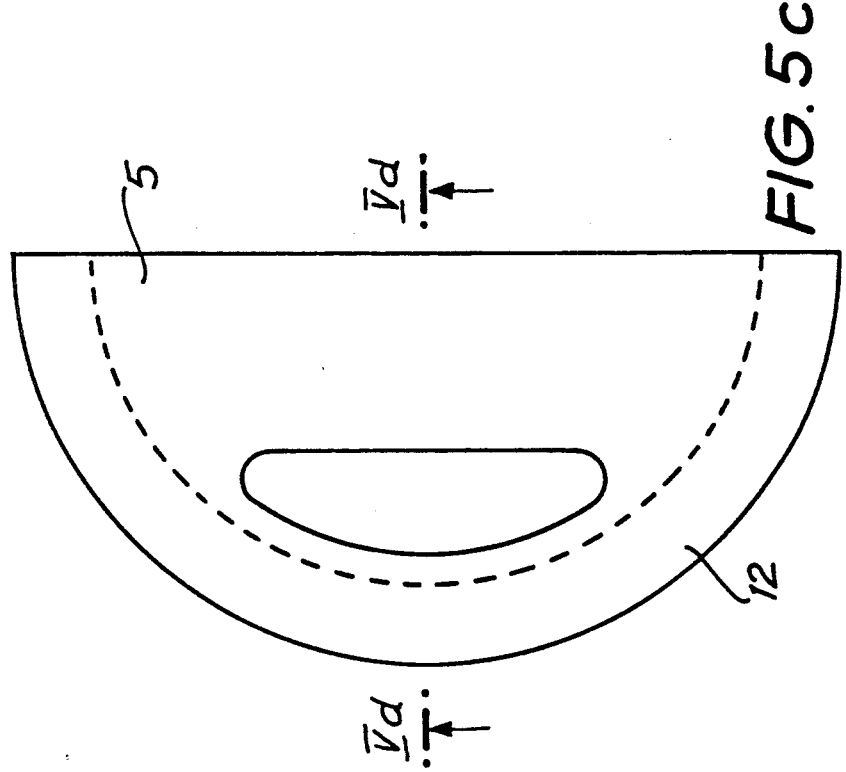
Figure 5D:
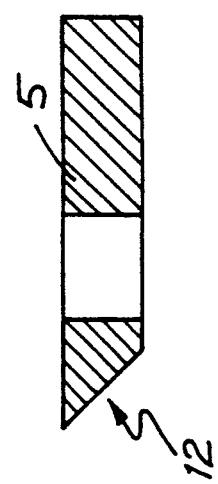

In FIGS. 5a and 5b, are illustrated plan and elevational views of the moon lock anchor construction which may be bolted to the earthmoving equipment by means of three bolts applied through the bores 6. Alternatively, the earthmoving equipment wear plate anchor may be attached to the earthmoving equipment by means of welding or any other suitable method of application, or, the moonlock anchors may be cast on as part of original equipment. A suitable constuction for an earthmoving equipment wear plate moon lock anchor which may be welded to the earthmoving equipment is illustrated in FIGS. 5c and 5d, FIG. 5c illustrating a plan view thereof, and FIG. 5d illustrating an elevational view thereof.

As will be noted, the moon lock anchor when attached to the base surface of the equipment is upstanding; whereas the corresponding lock anchor on the wear plate is recessed to thereby provide a male-female interlocking arrangement.

Figures 6A, 6B:
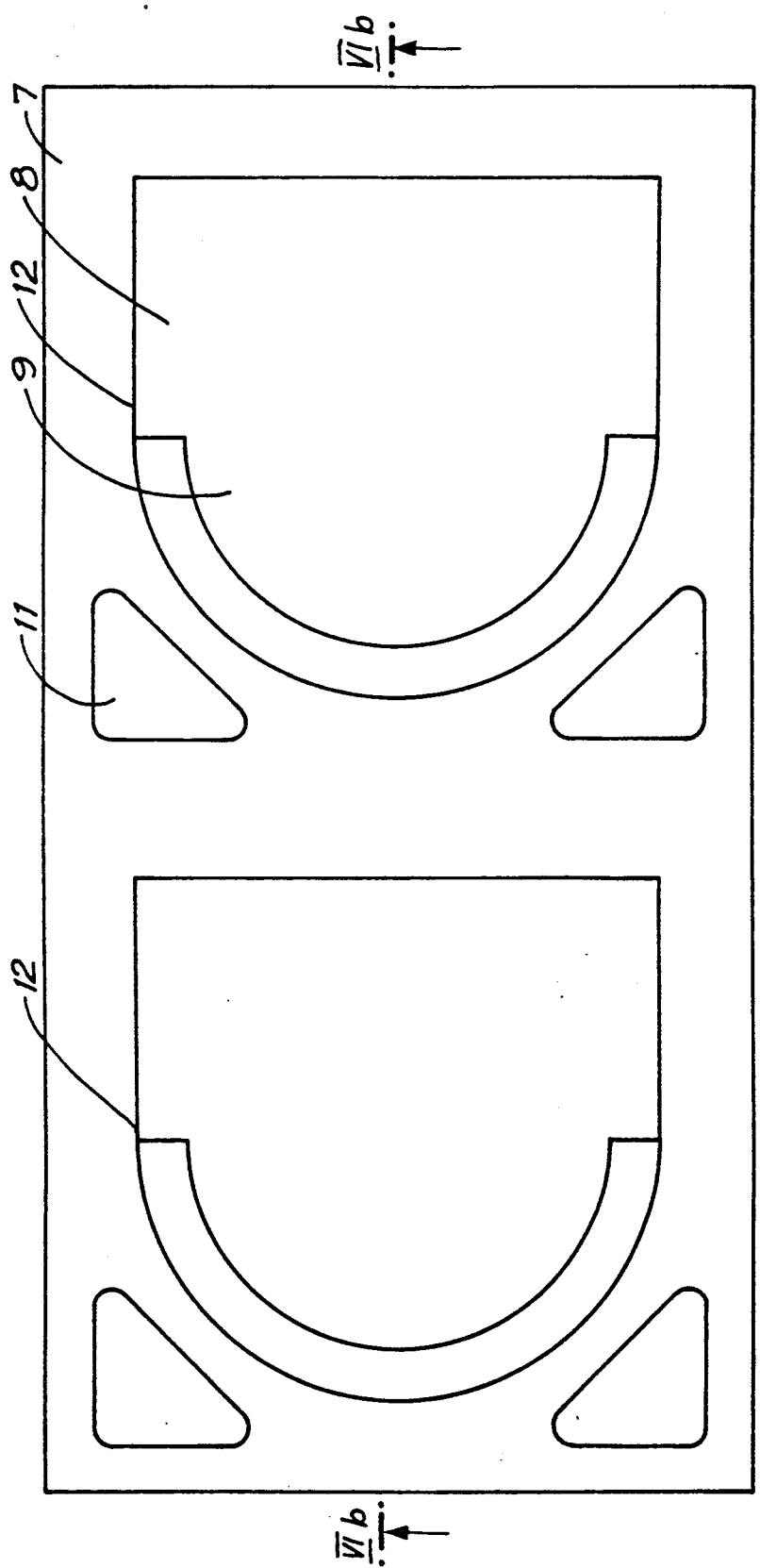
FIGS. 6a and 6b show a plan view and an elevational view of the moonlock adaptor plate.

In FIG. 6 is detailed a plan view and an elevational view of the moon lock adaptor plate, which is designed to inter-engage with the moon lock anchor 5 illustrated in FIG. 5. The base plate 7 of the moon lock anchor is provided with two cut-outs 12 thereon, each of the cut-outs being formed of a substantially rectangular section 8 and a semi-circular section 9. The curved edge of the semi-circular section 9 is tapered or inclined to correspond to the taper or incline 12 on the moon lock anchor 5 illustrated in FIG. 5 to enable the corresponding anchors to mate together. Also shown in FIG. 6 are cut-out portions 11, which are cut out for the purpose of reducing the weight of the adaptor plate 7 and consequently, the weight of the earthmoving equipment, and, also, to allow the plug welding of wear plates to the adaptor plate.

Figure 7:
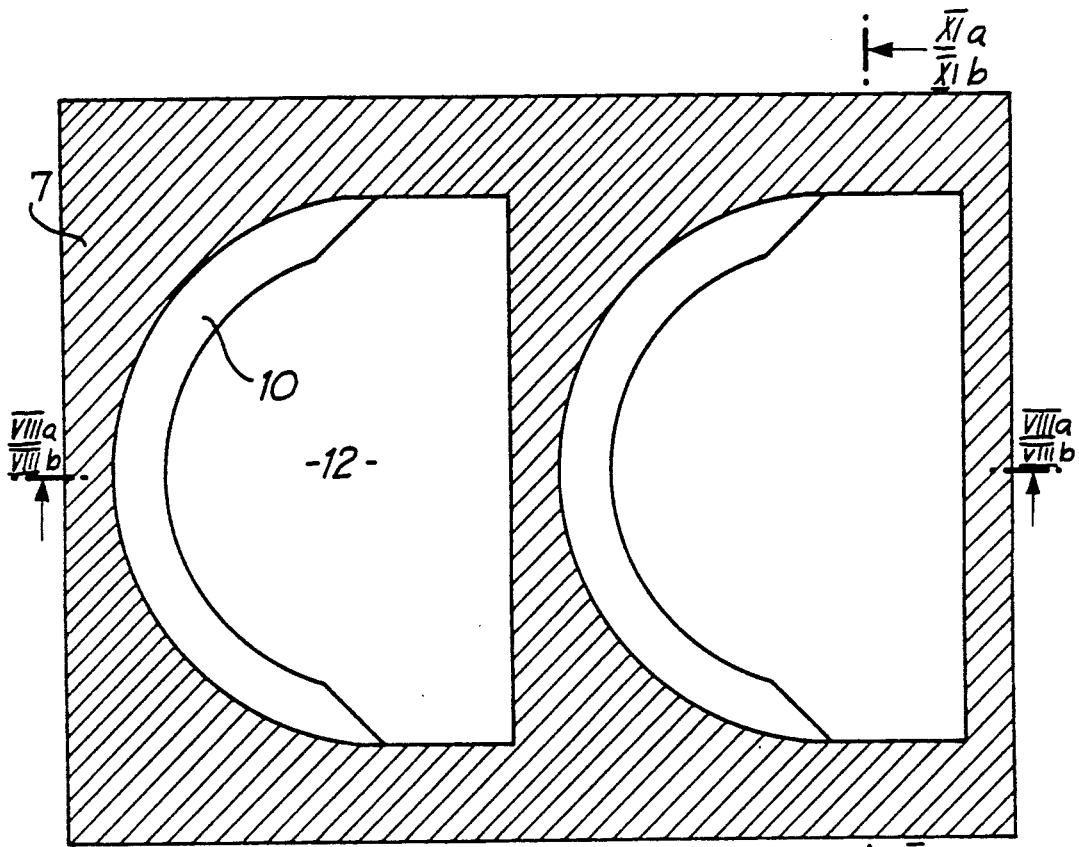
FIG. 7 shows a plan view of the underside of a moonlock anchor plate cast in a earthmoving equipment wear plate.

In FIG. 7, is illustrated a plan view of a moon lock adaptor plate 7 specifically designed for a earthmoving equipment wear plate, which has been cast in one section. The view shown in FIG. 7 is that of the underside of the moonlock adaptor plate 7.

Figure 8A:
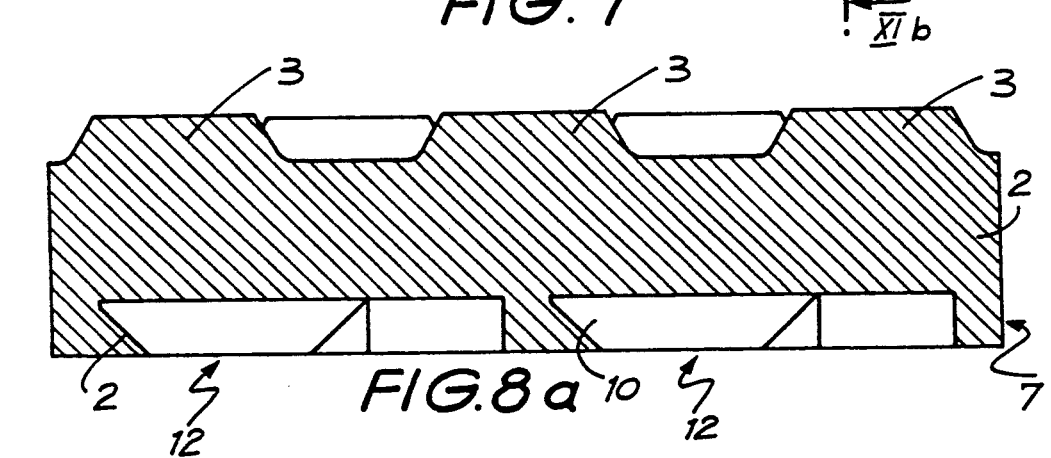
FIGS. 8a and 8b are elevational views of the wear plate cast with the moonlock anchor plate in a single piece construction.
Figure 8B:
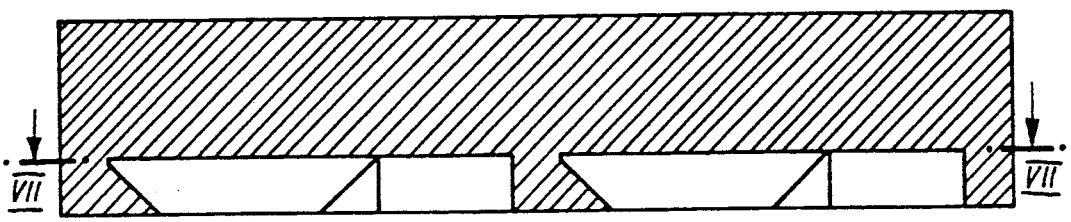

In FIGS. 8a and 8b are illustrated elevational views of the earthmoving equipment moon lock adaptor plate 7 as illustrated in FIG. 7. FIG. 8a illustrates the earthmoving equipment wear plate protrusions 3 at spaced apart locations upon the body 2 of the wear plate. FIG. 8a also illustrates the adaptor plate portion 7 of the wear plate with each of the shaped cut-outs 12 thereon for mating with the male portion of the moon lock anchor.

Figure 9:
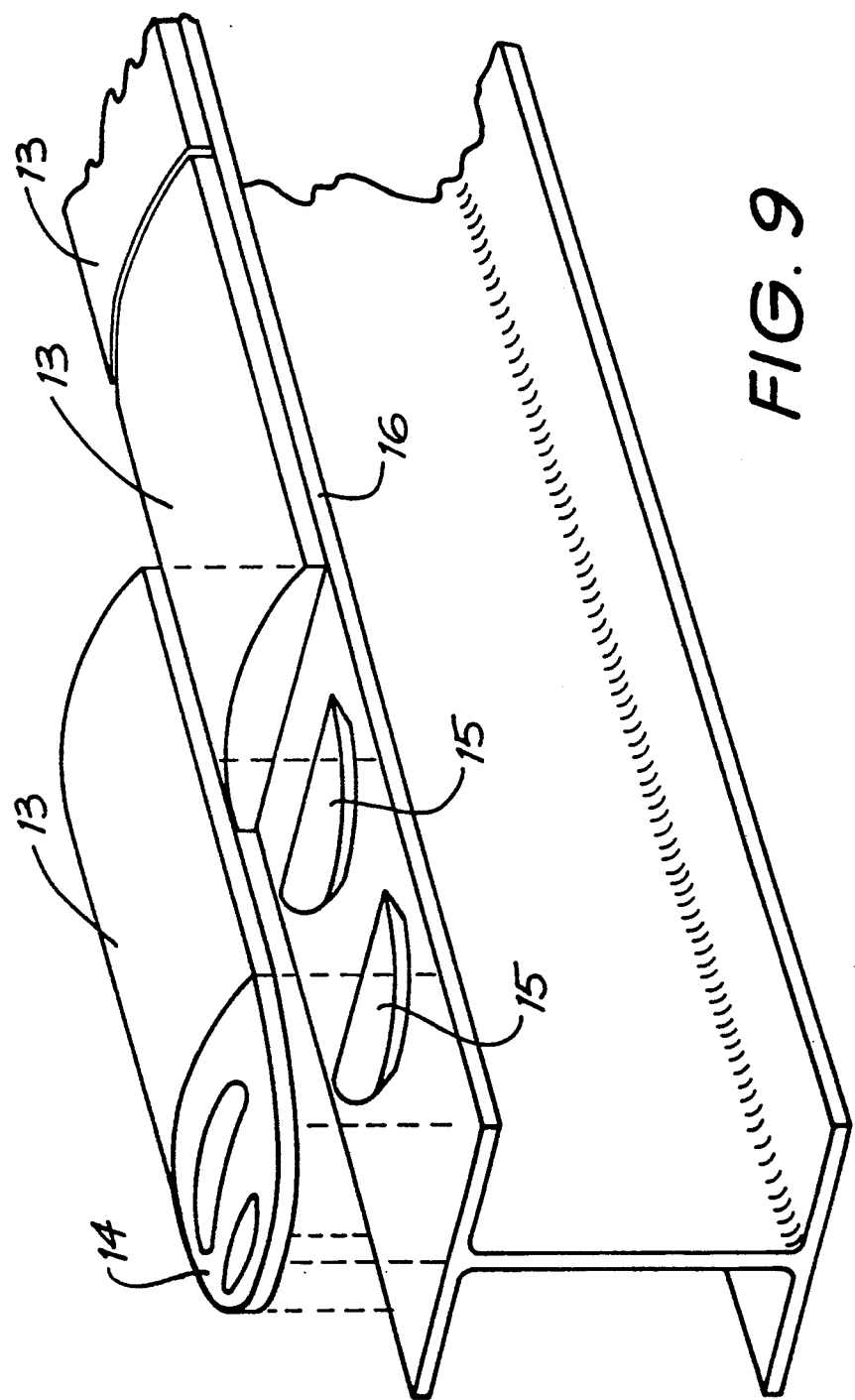
FIG. 9 illustrates a partially exploded isometric view of a moonplate arrangement as applied to sled base, provided with a bull nose retainer plate.

In FIG. 9 is illustrated a partially exploded isometric view of a moon plate arrangement as applied to a sled base, this arrangement also then provided with a bull nose retainer plate. As illustrated, each of the wear plates 13 are, one at a time, provided over a pair of male anchors 15, upon the base structure 16. Once each of the wear pads 13 are applied to the base plate 16 and interlocked with moonlock anchors 15, the bull nose retainer 14 is then applied adjacent one end thereof. The bull nose retainer 14 may be welded or bolted or applied to the base plate 16 by any suitable means of connection. Once the bull nose retainer 14 is applied to the base plate 16, the bull nose retainer 14 prevents any lateral movement of any of the wear pads 13, preventing any of the wear pads 13 from disengaging from the base plate 16. Consequently, each and every wear pad 13 is adapted to the base plate 16 on a semi-permanent basis.

Figure 10:
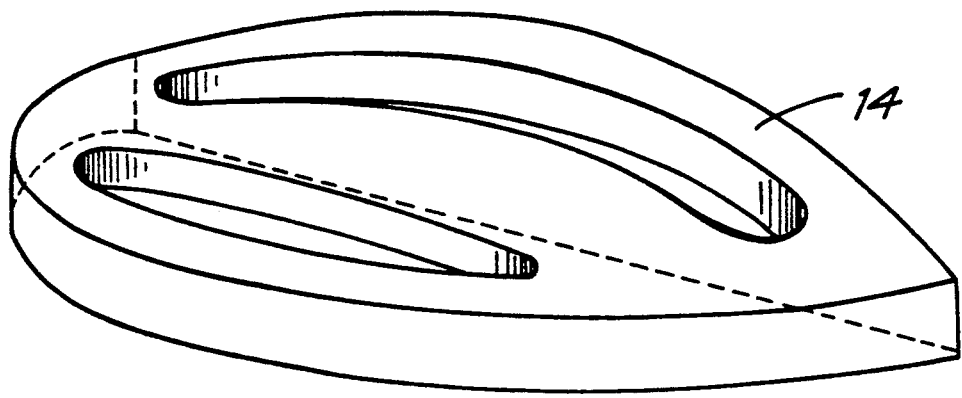
FIG. 10 details an isometric view of a bull nose keeper which may be welded to the apparatus adjacent to cast moon plate arrangements, as shown in FIG. 9.

In FIG. 10 is illustrated an isometric view of a bull nose keeper which may be welded to the apparatus adjacent to the cast moon plate arrangement as shown in FIG. 9. This bull nose keeper 14 is simply welded or applied by means of bolts or the like to the earthmoving equipment after each of the wear pads are applied thereto, to retain the wear pads 13 in position on the earthmoving equipment.

Figure 11A:
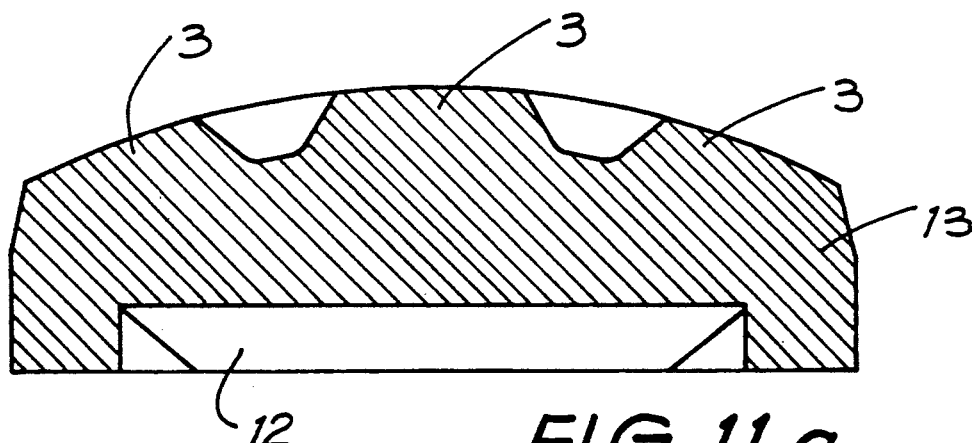
FIGS. 11a and 11b depict elevational views of wear pads cast with the moon lock arrangement for use with the sled base application shown in FIG. 9; and, FIGS. 12a, 12b, 12c and 12d which illustrate some alternative embodiments of varying shaped arrangements, each of which should be considered to be obvious alternative embodiments to the present invention.
Figure 11B:
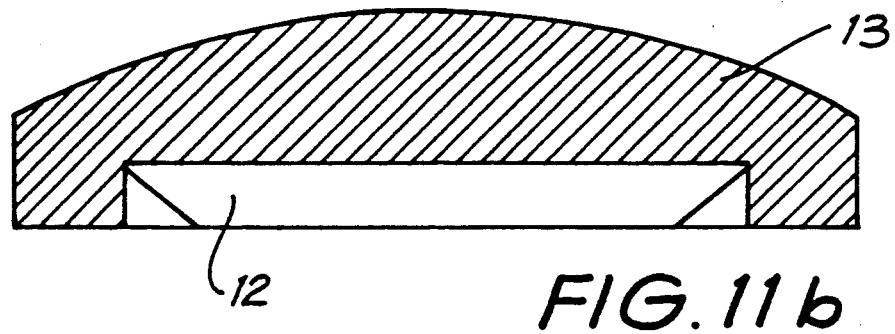
Figure 12D:
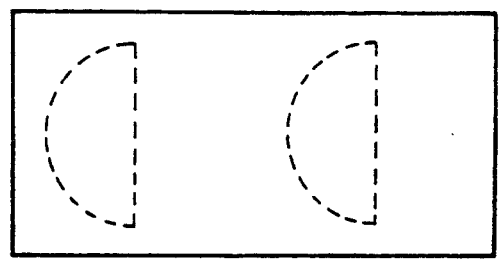
Figure 12C:
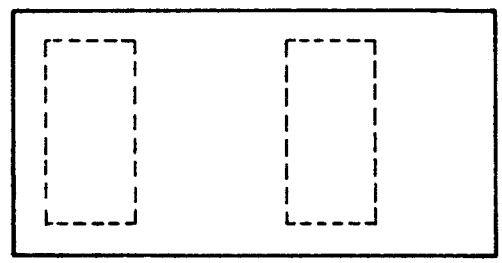
Figure 12B:
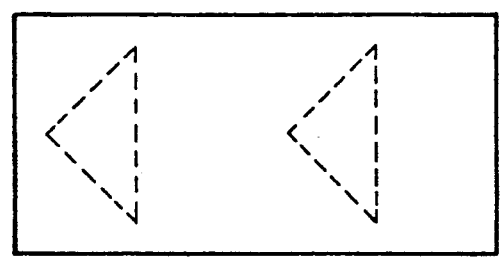
Figure 12A:
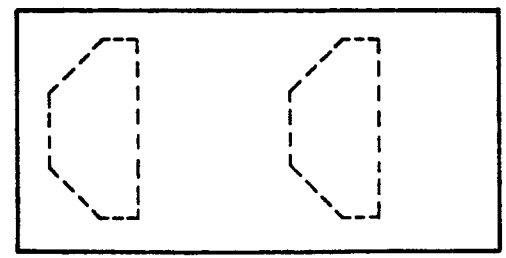

In FIG. 11 elevational views of the earthmoving equipment wear pads 13 as illustrated in FIG. 9 are shown. FIG. 11a illustrates the wear pad 13 with a shaped upper surface effectively providing protrusions 3 thereon, said protrusions 3 being of the format as hereinbefore described, or of any other appropriate format. The lower portion of the earthmoving equipment wear pad 13 is shown with a shaped cut-out 12 which equipment wear pad 13 is shown with a shaped cut-out 12 which as the female lock anchor is adapted to receive the male anchors 15 as shown in FIG. 9. FIG. 11b also illustrates a further elevational view of the earthmoving equipment wear pads 13 of FIG. 9. In this figure the earthmoving equipment wear pad 13 is shown from an end elevational view, which is of lesser height than the central portion of the wear pad as shown in FIG. 11a.

In FIG. 12, is shown some various alternative embodiments of the underside of the adaptor plate as hereinbefore described. As illustrated, the earthmoving equipment wear plate adaptor plate may take the form of varying shapes, for instance octangular, triangular, square or semi-circular shape, it should be understood that any other shaped anchors and corresponding adaptor plates may be provided, to achieve the same function of male-female connection of the locking arrangement as hereinbefore described.

It should be understood to people skilled in the art that numerous other variations and modification can be made to the invention as hereinbefore described. Such variations and modifications should however be considered to be within the scope of the present invention as broadly described hereinbefore and as claimed hereinafter.

I claim:

1. A locking arrangement for fastening a plurality of rectangularly shaped wear-resistant plate members in edge-to-edge relationship to a base surface member of equipment in which said base member is subject to wear during use which comprises:

locking anchors on said base surface in spaced-apart relationship configured to lockingly engage at least one complementary locking anchor on each of said wear-resistant plate members in male-female relationship, said locking anchor on one member being a male locking anchor of substantially moon-shaped configuration and said locking anchor on the other member being a female locking anchor of substantially moon-shaped configuration, said respective substantially moon-shaped male-female locking anchors being mutually interlockable, the configuration of the wear resistant plate members being such that when interlocked with the base surface member, the plate members are in abutting edge-to-edge contact, the abutment between the plate members being such as to maintain the locking anchors in mutual interlocked engagement and thus prevent the interlocked members from disengagement.

2. The locking arrangement as claimed in claim 1, wherein said base surface is the underside of a mining equipment, washery equipment, earthmoving equipment or crushing equipment.

3. The locking arrangement as claimed in claim 2, wherein said wear resistant plate members are adapted for said mining equipment.

4. The locking arrangement as claimed in claim 3, wherein said wear plates are comprised of:

a plate member, a first side of which is attachable to a surface of said earthmoving equipment to be protected from wear; and a second side of which has a plurality of wear blocks projecting therefrom in spaced apart arrangement; and characterized in that, each of said wear blocks is adapted to be removably affixed to said base surface of said equipment without the requirement for welding.

5. The locking arrangement as claimed in claim 1, wherein, said anchors are formed as castings integral with the equipment or manufactured as plate for attachment to the equipment.

6. A locking arrangement as claimed in claim 1, wherein the edge-to-edge abutment of said wear resistant plates is further enhanced by a retaining member which abuts a periphery of said wear resistant plates.

7. A method of assembling a plurality of wear-resistant plate members to a base surface of a working equipment in which the base surface is subject to wear, said base surface having locking anchors provided in spaced relationship thereon, and said plate members each having at least one locking anchor receiving portion thereon, said locking anchors being mutually interlockable in male-female relationship and having a substantially moon-shaped configuration, said method comprising the steps of:

assembling a first of said wear resistant plate members onto said base surface by providing said at least one moon-shaped anchor-receiving portion thereof in male-female engagement with a respective one of said moon-shaped anchors;

assembling further plate members onto said base member, each of said plate members being assembled in end abutting relationship with plate members subsequently assembled to said base member, such that the abutment of one plate against the other prevents subsequently applied plate members from disengagement of the mutually interlocked anchors; and assembling retaining members on at least one peripheral row of said plate members to abut with and enhance the fastening of said plate members to said base surface.

8. A method of assembling a plurality of plate members to a base plate as claimed in claim 7, wherein said working equipment is an earth moving equipment, wherein each of said wear plates is affixed to the earthmoving equipment through the use of a plate member attached to said earthmoving equipment having said moon-shaped locking anchors thereon and removably affixing a plurality of wear blocks to said plate member via their respective lock anchors;

characterised in that, after wear of said wear blocks, said wear blocks may be removed from said plate member and replaced, said wear blocks being removably affixed without the requirement for welding.

9. A locking arrangement for fastening a plurality of rectangularly shaped wear-resistant plate members in edge-to-edge relationship to a base surface member of a working equipment in which said base member is subject to wear during use which comprises:

locking anchors on said base surface in spaced-apart relationship configured to lockingly engage at least one complementary locking anchor on each of said wear-resistant plate members in male-female relationship, said locking anchors having a substantially moon-shaped configuration, said locking anchor on said base surface being a substantially moon-shaped male locking anchor having an inwardly inclined edge and said locking anchor on the wear-resistant plate being a substantially moon-shaped female locking anchor with a corresponding inclined edge that mates with the inclined edge of said male locking anchor, said male-female locking anchors being mutually interlockable when the inclined edges are mated together, the configuration of the wear resistant plate members being such that when interlocked with the base surface member, the plate members are in abutting edge-to-edge contact, the abutment between the plate members being such as to maintain the locking anchors in mutual interlocked engagement.

10. The locking arrangement as in claim 9, wherein a retaining member is applied to abut at least one peripheral row of said wear resistant plate members to enhance the fastening of said plate members to said base.

* * * * *